United States Patent [19]
Gaudion

[11] 3,797,720
[45] Mar. 19, 1974

[54] NUMERICALLY CONTROLLED WORK TRANSPORT FOR FORMING PRESS

[75] Inventor: Walter R. Gaudion, Reading, Mass.

[73] Assignee: Ambrit, Inc., Wilmington, Mass.

[22] Filed: Aug. 1, 1972

[21] Appl. No.: 277,091

[52] U.S. Cl............ 226/33, 226/171, 226/188, 425/136, 425/143, 264/40
[51] Int. Cl............................................ B65h 23/18
[58] Field of Search .......... 425/145, 136, 169, 162, 425/168; 226/33, 171, 43, 45, 188

[56] References Cited
UNITED STATES PATENTS

| | | | |
|---|---|---|---|
| 3,465,384 | 9/1969 | Barchi et al. .................... | 425/145 |
| 3,726,334 | 4/1973 | Sallberg et al. .................. | 425/145 X |
| 3,561,057 | 2/1971 | Butzko............................ | 425/384 X |
| 3,504,074 | 3/1970 | Snow .............................. | 425/384 X |
| 3,115,999 | 12/1963 | Wythe............................. | 226/33 |
| 3,248,030 | 4/1966 | Ganzhorn ........................ | 226/33 |
| 3,715,090 | 2/1973 | Kostusiak et al. ................ | 226/33 X |

Primary Examiner—Allen N. Knowles
Attorney, Agent, or Firm—Thomas N. Tarrant

[57] ABSTRACT

A press for forming preprinted plastic shapes at high speed from a plastic web transported by a feedback controlled hydraulic motor in which a registration mark relative to the preprinted design is detected and the hydraulic motor is driven to a controlled stop at the press position in accordance with a ramp and count in a numerical control device.

4 Claims, 3 Drawing Figures

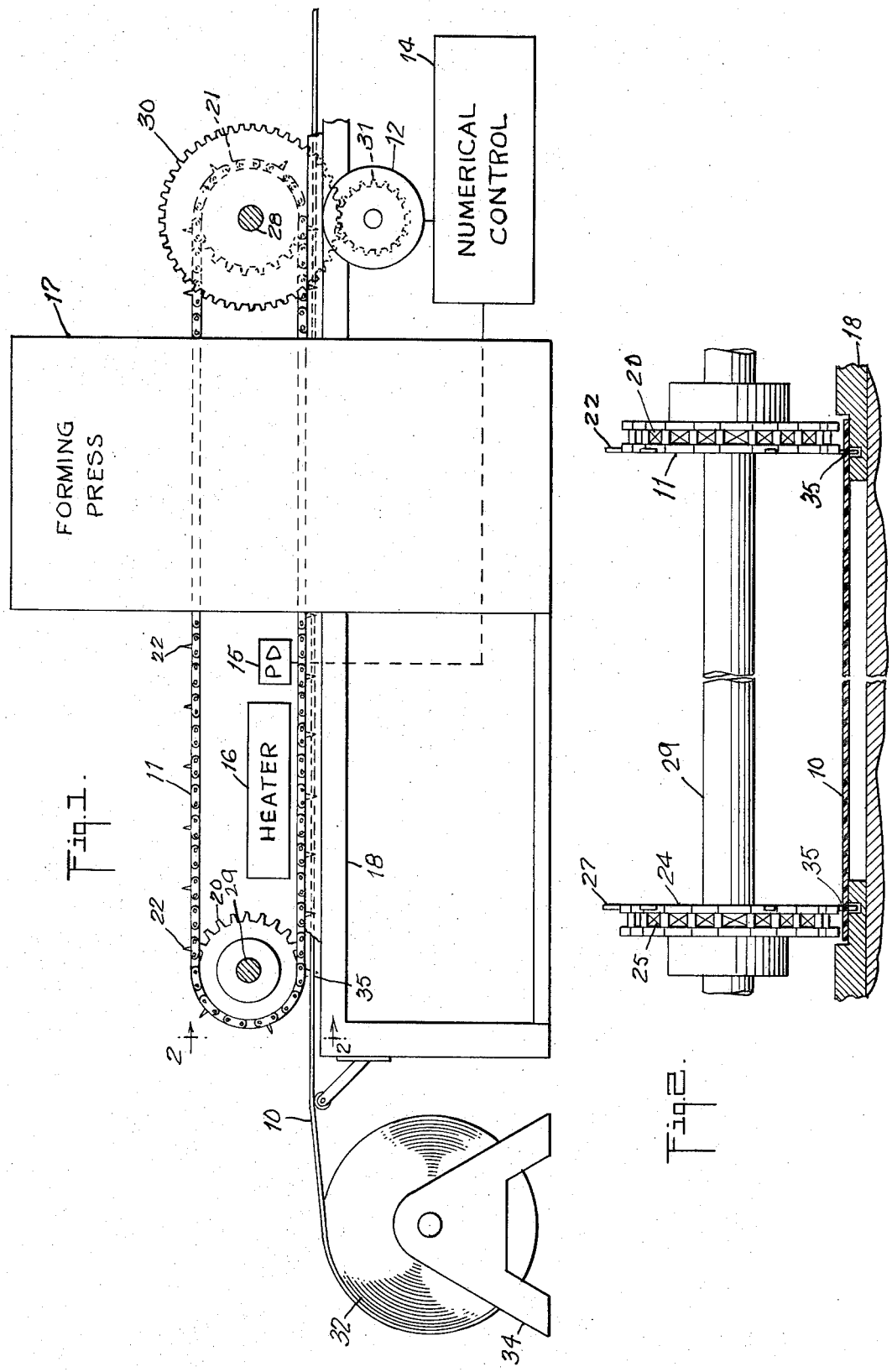

NUMERICALLY CONTROLLED WORK TRANSPORT FOR FORMING PRESS

BACKGROUND OF THE INVENTION

1. Field of the Invention

The present invention relates to forming presses operating in conjunction with a moving web of sheet material to be formed and particularly with registration indexing for such presses operating at a high speed stop and start manner.

2. Description of the Prior Art

The cost of packaging containers today is frequently a question of the speed of the forming machines. An example of a plastic forming machine is found in U.S. Pat. No. 3,647,335 of Fred Brown. Brown provides for printing, if desired, after the forming operation. Printing in Brown's apparatus is limited by the difficulty of matching the contours of the formed surfaces and also by the difficulty in maintaining the proper consistency of the printing inks under the slow speed conditions of the forming press. The difficulties of printing on the various contours of preformed material as well as the facility of printing at higher speeds make it desirable to preprint the material while still in continuous sheet form.

With preprinting, a registration problem arises. U.S. Pat. No. 3,555,127 of Messer et al. describes a registration system useful in cutting out flooring tiles to match a preprinted pattern. Messer et al use a continuous feed and synchronize the continuous operation of the press with photodetection of the preprinted pattern as it approaches the press. The Messer et al. system would not be effective for use with a forming press for plastics since plastic forming usually requires preheating of the plastic. Since the heat softened plastic distorts easily, a continuous drive to a reciprocating press operation would produce excessive distortion and misregistration. Thus registration detection in plastic forming should determine a stopping point for the plastic web relative to the forming press. This has had the result of greatly reducing the speed capability. Registration has been fairly accurate at low speeds, stopping the web for forming. Higher speeds are attainable with reasonable registration if the press is caused to move in synchronism with the web. Synchronous movement of the press is costly and complex. Stop and start systems have been complicated by the substantial inertia involved in the plastic web. A good deal of motive power is required and the web tends to stretch or buckle causing misregistration.

SUMMARY OF THE INVENTION

Now, in accordance with the present invention, a stop and start press is provided for operation at high speeds. A preprinted plastic web is driven along each of its edges using a feedback controlled hydraulic torque amplifier. Photodetection of registration marks provides signals to numerical control circuitry which accurately governs stop-start operation of the hydraulic motor in accordance with optimum preset acceleration contours.

Thus it is an object of the invention to provide a novel high speed forming press for forming plastic shapes from a preprinted web of sheet material;

It is a further object of the invention to provide registration control in high speed stop and start motion of a plastic web;

It is still a further object of the invention to provide a combination of numerical controls with a feedback controlled hydraulic motor to achieve optimum deceleration and acceleration contours in the high speed stop and start motion of a web of sheet material being transported.

Further objects and features of the invention will be best understood upon reading the following description together with the drawing.

BRIEF DESCRIPTION OF THE DRAWING

FIG. 1 is a diagrammatic illustration of a forming press and work transport in accordance with the invention.

FIG. 2 is a lateral section of FIG. 1.

DESCRIPTION OF THE PREFERRED EMBODIMENT

Figure 3:
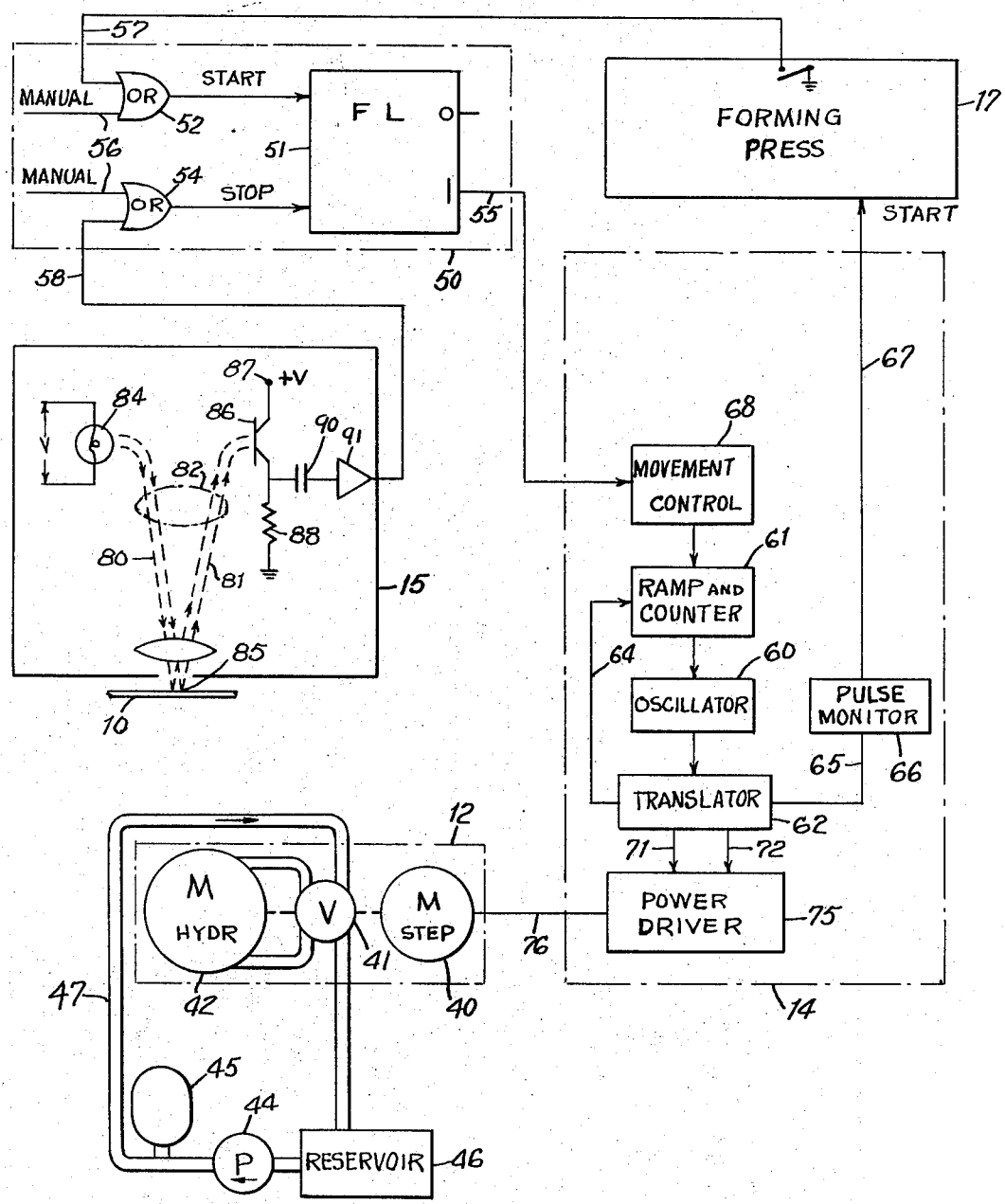
FIG. 3 is a block diagram partially schematic of the transport drive source and controls for the press and transport of FIG. 1.

Plastic sheet material can be printed continuously at high speeds. Thus it is most common to preprint plastic sheet material in separate machines from those used in forming the plastic into useful shapes. The preprinted plastic sheet material, stored in a roll, is later inserted into the forming machine where it is heat softened before operation of the forming press. Since the sheet material undergoes dimensional distortion upon heating, a registration detector in accordance with the invention precedes the forming press to maintain registration synchronism. As depicted in FIG. 1, preprinted plastic sheet 10 is engaged by transport chain 11 powered by electrohydraulic pulse motor 12 controlled by numerical control device 14. Photodetector 15 follows heater 16 and precedes forming press 17.

Forming press 17 is mounted together with a transport table 18 and chain 11 is mounted on table 18 by sprockets 20 and 21 supported at opposite ends of table 18. Chain 11 carries regularly spaced gripping elements 22 for engaging the edge of plastic sheet 10. Like chain 24, supported on sprocket 25 and a further sprocket (not shown) on axle 28, carries like gripping elements 27 for engaging the opposite edge of plastic sheet 10.

Sprocket 21 and the further sprocket are mounted on a common axle 28 with spur gear 30. Spur gear 30 meshes with second spur gear 31 so that gears 30 and 31 provide a reduction ratio. Spur gear 31 is connected to electrohydraulic pulse motor 12. Plastic sheet 10 is provided from roll 32 mounted adjacent table 18 on a supporting stand 34.

Supporting stand 34 is mounted to the floor (not shown). However, it may be mounted directly to table 18. While table 18 is depicted as a separate structure, it may be an integral part of forming press 17.

Following pick-up point 35, along which chains 11 and 24 engage plastic sheet 10, is heater 16. Heater 16 provides the necessary increase in temperature to plastic sheet 10 for forming. Heater 16 may consist of electric heater elements or it may use any other type of heat source such as steam, combustion or some form of radiant heating.

Following heater 16 and immediately prior to the forming position in forming press 17 is photodetector 15 positioned adjacent to the transport path of plastic sheet 10 for detecting registration marks. Photodetector 15 may take the form of any type of detector for sensing registration marks. For example, if the registration marks are punched holes or notches, the detector may be a feeler element instead of a photodetector. In any case the detector is connected to numerical control 14 to provide a stop signal for stopping plastic sheet 10 in proper registration in forming press 17.

The transport and indexing system will be better understood referring to FIG. 3. Electrohydraulic step motor 12 is depicted in dashed outline as comprising an electrical step motor 40, hydraulic valve 41 and hydraulic motor 42. Electrohydraulic step motors have come into wide use in recent years to power numerically controlled machine tools. Since they have not been used in the field of plastic forming machines, a brief description will be helpful.

Valve 41 comprises an axially moving valve member which is moved by rotation of step motor 40 turning the valve member into a threaded channel mechanically connected to hydraulic motor 42. Movement of the valve member opens the hydraulic lines driving the hydraulic motor. The hydraulic motor in turn rotates the threaded channel moving the valve member back toward its starting position. This provides a negative feedback loop whereby hydraulic motor 42 follows step motor 40 and in fact provides hydraulic torque amplification. Valve 41 is commonly a four-way valve such that by reversing step motor 40 and thus the axial direction of the valve member, the hydraulic path is reversed, reversing the direction of motion of motor 42. The speed of motor 42 is controlled by the rate of step pulses provided by step motor 40.

Hydraulic pump 44, pressure chamber 45, reservoir 46 and hydraulic circuit 47 are connected to electrohydraulic pump motor 12 as a power source.

Numerical control 14 is connected to start-stop controls 50. Start-stop controls 50 will usually be enclosed in a common housing either with numerical control 14 or photodetector 15 but are shown here in separate outline for convenience of explanation. Start-stop controls 50 are depicted as consisting of a flip-flop latch 51, and input OR circuit 52 to signal start and input OR circuit 54 to signal stop.

Output 55 of flip-flop 51 provides the start-stop signal to numerical control 14. Inputs 56 to OR circuits 52 and 54 are suitably manual push buttons to provide manual stop and start signals. Second input 57 to OR circuit 52 is provided by a microswitch in forming press 17 operated upon opening of the press. Second input 58 to OR circuit 54 is connected to photodetector 15 responsive to a pulse from the photodetector.

Numerical control 14 is basically an oscillator circuit with suitable controls and amplifiers for driving step motor 40. Thus numerical control 14 includes oscillator 60 which is suitably a voltage variable oscillator connected to ramp and counter 61 and to translator 62. Upon either a turn-on or turn-off signal, ramp and counter 61 provides an up ramp or down ramp respectively of voltage to oscillator 60.

The ramp circuit in ramp and counter 61 is designed to provide acceleration contours to meet the other parameters of the system. In one model driving an 18 inch wide plastic web, the ramp was designed to accelerate the web linearly in a distance of 8 inches from stop to a velocity of 60 inches per second. This is a reasonably satisfactory acceleration for most purposes but with plastic webs wider than forty inches or of greater than ordinary weight, the amount of hydraulic power required can make it desirable to reduce the acceleration slope. It will be understood that the amount of hydraulic power available is the principal limiting factor on acceleration for any given plastic web.

Translator 62 comprises circuits for amplifying shaping and phase shifting the oscillator pulses. Output 64 of translator 62 provides a count of oscillator signals to the counter in ramp and counter 61. Output 65 of translator 62 is connected to pulse monitor 66. Pulse monitor 66 is suitably a time-constant controlled relay which is set by the first output pulse from oscillator 62 and switches upon a cessation of pulses.

Pulse monitor 66 is connected by output 67 to forming press 17 to provide a start signal. Movement control 68 is the control logic of numerical control 14. The output of movement control 68 is connected to ramp and counter 61 for starting and stopping oscillator 60.

Translator 62 provides two outputs, 71 and 72 to power driver 75. Power driver 75 is essentially a pulse amplifier for driving step motor 40 through output 76. The phase relationship between outputs 71 and 72 of translator 62 determines the direction of rotation of step motor 40.

Photodetector 15 is depicted as using fiberoptic light guides 80 and 81 to enable positioning flexibility of the sensing point while maintaining most of the detector substantially stationary.

Fiberoptic guides 80 and 81 are suitably housed in a single cable depicted by dashed circle 82. A source of illumination 84 provides light through fiberoptic guide 80 to sensing point 85. Fiberoptic guide 81 picks up light reflected from sensing point 85 taking it to phototransistor 86. Phototransistor 86 is connected to a voltage source at 87 and through a load resistor 88 to the other side of the voltage source. A capacitor 90 provides a pulse input to amplifier 91 each time there is a change in light sensed by transistor 86. The output of amplifier 91 is connected to OR circuit 54 by connection 58.

In operation, plastic sheet 10 is fed into engagement with chains 11 and 24. Automatic operation is commenced with manual start 56. Movement control 68 starts ramp 61 providing ramp voltage to oscillator 60. Translator 62 sets pulse monitor 66 and provides stepping pulses to motor 40 through power drive 75. Valve 41 opens providing power to hydraulic motor 42 and driving chains 11 and 24. Chains 11 and 24 transport plastic sheet 10 past heater 16 softening the plastic. As a preprinted pattern approaches forming press 17, a related registration mark is detected by photodetector 15. Photodetector 15 provides a stop signal to flip-flop latch 51. In response to switching of latch 51, movement control 68 starts a down ramp in ramp and counter 61. The start of this down ramp may be accurately delayed by the use of delay counters in movement control 68. The down ramp lowers the control voltage to oscillator 60 lowering its frequency. Simultaneously the counter in ramp and counter 61 counts the pulses from translator 62. In one machine, a three-decade counter was used to count 999 pulses.

At the end of the predetermined count the oscillator stops. On detecting the absense of pulses, pulse monitor 66 provides a start signal to forming press 17. Forming press 17 closes forming the plastic and commences opening. Opening of forming press 17 is signalled to OR circuit 52 to restart the cycle.

While the invention has been described with relation to a specific embodiment, it is to be understood that many variations are contemplated as part of the invention. Thus, the apparatus can include various other work stations such as printing stations and punching stations. Similarly, the forming press can be a single or multiple unit press with appropriate indexing marks or provision for skipping indexing marks so that the appropriate number of design areas enter the forming press before each forming operation. Thus, it is intended to cover the invention fully within the scope of the appended claims.

I claim:

1. Apparatus for transporting sheet material to forming presses at high speed comprising:
   a. Support structure;
   b. Continuous sheet transport means mounted on said support structure for transporting said sheet material across said structure;
   c. An electrohydraulic step motor for driving said transport means;
   d. Numerical control signal means for reducing the stepped drive to said hydraulic motor by ramping down the step frequency following receipt of a stop signal whereby accurate stop registration is obtained.

2. Apparatus for transporting sheet material according to claim 1 wherein said step frequency is ramped down over a predetermined number of steps.

3. Apparatus for transporting sheet material according to claim 1 wherein said sheet material is a preprinted plastic web and said stop signal is generated by a detection device for detecting marking of said preprinted web related to registration of a preprinted pattern.

4. Apparatus for transporting sheet material to forming presses at high speed comprising:
   a. A transport bed;
   b. Continuous sheet transport means mounted on said bed for transporting sheet material thereacross;
   c. An electrohydraulic step motor for driving said transport means;
   d. Numerical control signal means for accelerating the stepped drive to said motor by ramping up the step frequency for starting and for decelerating the stepped drive to said motor by ramping down the step frequency for stopping.

* * * * *